(12) United States Patent
Chen et al.

(10) Patent No.: US 8,242,389 B2
(45) Date of Patent: Aug. 14, 2012

(54) PORTABLE ELECTRONIC DEVICE AND METHOD FOR OPERATING THE SAME

(75) Inventors: Yi-kuo Chen, Tao Yuan (TW); Chien-cheng Yeh, Tao Yuan (TW)

(73) Assignee: HTC Corporation, Taoyuan County (TW)

( * ) Notice: Subject to any disclaimer, the term of this patent is extended or adjusted under 35 U.S.C. 154(b) by 695 days.

(21) Appl. No.: 12/061,660

(22) Filed: Apr. 3, 2008

(65) Prior Publication Data

US 2009/0114458 A1    May 7, 2009

(30) Foreign Application Priority Data

Nov. 7, 2007  (TW) ................................ 96142062 A

(51) Int. Cl.
 *G08C 21/00*  (2006.01)
(52) U.S. Cl. ........................ 178/19.01; 345/156; 345/179
(58) Field of Classification Search ................ 178/19.01
See application file for complete search history.

(56) References Cited

U.S. PATENT DOCUMENTS

| | | | |
|---|---|---|---|
| 4,594,548 A | | 6/1986 | Takahashi et al. |
| 4,643,604 A | | 2/1987 | Enrico |
| 5,067,573 A | * | 11/1991 | Uchida .......................... 345/173 |
| 5,635,959 A | | 6/1997 | Takeuchi et al. |
| 5,649,463 A | | 7/1997 | Lindee et al. |
| 5,750,939 A | | 5/1998 | Makinwa et al. |
| 5,844,543 A | * | 12/1998 | Tamura et al. ................. 345/156 |
| 6,114,958 A | * | 9/2000 | Murphy ...................... 340/568.1 |
| 6,681,333 B1 | * | 1/2004 | Cho .............................. 713/300 |
| 6,924,791 B1 | * | 8/2005 | Nicolas et al. ................ 345/173 |
| 7,046,237 B1 | * | 5/2006 | Nicolas et al. ................ 345/179 |
| 7,626,582 B1 | * | 12/2009 | Nicolas et al. ................ 345/204 |
| 2001/0020455 A1 | | 9/2001 | Schifferl |
| 2002/0103616 A1 | | 8/2002 | Park et al. |
| 2002/0190823 A1 | | 12/2002 | Yap |
| 2004/0212604 A1 | | 10/2004 | Ong |

FOREIGN PATENT DOCUMENTS

| | | |
|---|---|---|
| CN | 2502312 Y | 7/2002 |
| JP | 2004-311192 | 11/2004 |
| TW | 495088 | 7/2002 |
| TW | 514940 | 12/2002 |
| TW | 547691 | 8/2003 |
| TW | M260799 | 4/2005 |
| TW | 200537354 | 11/2005 |
| TW | 200612236 | 4/2006 |

(Continued)

OTHER PUBLICATIONS

Translation of TW 495088, publication date Jul. 11, 2002.*

(Continued)

*Primary Examiner* — Quan-Zhen Wang
*Assistant Examiner* — David Lee
(74) *Attorney, Agent, or Firm* — Jianq Chyun IP Office

(57) ABSTRACT

A portable electronic device includes a main body, a stylus and a switch. The main body has a containing slot and the stylus is suitable for being inserted into the containing slot. The switch is disposed at a side of the containing slot and electrically connected to the main body. When the stylus is inserted into the containing slot, the switch is pressed by the stylus. When the stylus is taken out from the containing slot, the switch is released to enable the main body to execute a presetting function.

10 Claims, 3 Drawing Sheets

FOREIGN PATENT DOCUMENTS

TW    M295766    8/2006

OTHER PUBLICATIONS

"Office Action of Taiwan Counterpart Application," issued on Nov. 16, 2010, p. 1-p. 4, in which the listed reference was cited.

"1st Office Action of China counterpart application", issued on Jan. 15, 2010, p. 1-p. 4.

"First Office Action of China Counterpart Application," issued on Aug. 3, 2010, p. 1-p. 6, in which US20020190823 was cited.

"Office Action of Taiwan Counterpart Application," issued on Nov. 11, 2010, p. 1-p. 8, in which TW547691, TWM260799, and TWM295766 were cited.

"First Office Action of China Counterpart Application," issued on Aug. 28, 2009, p. 1-p. 6, in which US20020103616 was cited.

"Office Action of Taiwan Counterpart Application," issued on Nov. 16, 2010, p. 1-p. 4, in which TW200612236 was cited.

"First Office Action of U.S. Co-pending Application," issued on May 29, 2008, p. 1-p. 12, in which US20020103616, US 4594548, and US5649463 were cited.

"Office Action of Taiwan Counterpart Application," issued on Apr. 8, 2011, p. 1-p. 4, in which TW200537354, JP2004-311192, and TW514940 were cited.

"Office Action of Taiwan Counterpart Application," issued on Apr. 7, 2011, p. 1-p. 4, in which TW200537354 and TW200612236 were cited.

"Final Office Action of America Co-pending Application (U.S. Appl. No. 12/129,618)", issued on Aug. 31, 2011, p. 1-p. 14, in which US5750939 was cited.

"Office Action of America Co-pending Application (U.S. Appl. No. 12/129,618) after RCE", issued on Feb. 3, 2012, p. 1-p. 14, in which US20010020455 was cited.

"Office Action of America Co-pending Application (U.S. Appl. No. 12/056,285)", issued on Nov. 2, 2011, p. 1-p. 13, in which US4643604 was cited.

"Final Office Action of America Co-pending Application (U.S. Appl. No. 12/056,285)", issued on Feb. 7, 2012, p. 1-p. 14.

* cited by examiner

PORTABLE ELECTRONIC DEVICE AND METHOD FOR OPERATING THE SAME

CROSS-REFERENCE TO RELATED APPLICATION

This application claims the priority benefit of Taiwan application serial no. 96142062, filed on Nov. 7, 2007. The entirety the above-mentioned patent application is hereby incorporated by reference herein and made a part of specification.

BACKGROUND OF THE INVENTION

1. Field of the Invention

The present invention generally relates to a portable electronic device, and more particularly, to a portable electronic device having a stylus.

2. Description of Related Art

Along with the progress in science and technology, the human relies on electronic products increasingly day by day. In order to suit the demand on high speed, high efficiency and light-slim-short-small design today, various portable electronic devices, for example, ultra mobile personal computer (UMPC), tablet PC, pocket PC, personal digital assistant (PDA) and mobile phone, have been launched on the market with increasing usage efficiency.

In the prior art, a user usually needs to press a power switch of a portable electronic device to switch the working modes thereof, for example, sleep mode, standby mode, switch on mode or switch off mode.

SUMMARY OF THE INVENTION

Accordingly, the present invention is directed to a portable electronic device, where once a stylus is taken out from a containing slot of a main body of the portable electronic device, the main body of the portable electronic device executes a presetting function.

The present invention is further directed to a method for operating a portable electronic device, where once a stylus is taken out from a containing slot of a main body of the portable electronic device, the main body of the portable electronic device executes a presetting function.

The present invention provides a portable electronic device, which includes a main body, a stylus and a switch. The main body has a containing slot suitable for containing the stylus. The switch is disposed at a side of the containing slot and electrically connected to the main body. When the stylus is inserted into the containing slot, the stylus presses the switch; when the stylus is taken out from the containing slot, the stylus releases the switch so as to enable the main body to execute a presetting function.

The present invention further provides a method for operating a portable electronic device wherein the portable electronic device includes a main body having a containing slot, a stylus suitable for being inserted into the containing slot and a switch disposed at a side of the containing slot. The method comprises that the stylus is taken out from the containing slot so as to enable the main body to execute a presetting function.

Since a switch is disposed at a side of the containing slot, the switch is released when the stylus is taken out from the containing slot, so that the main body executes the presetting function.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
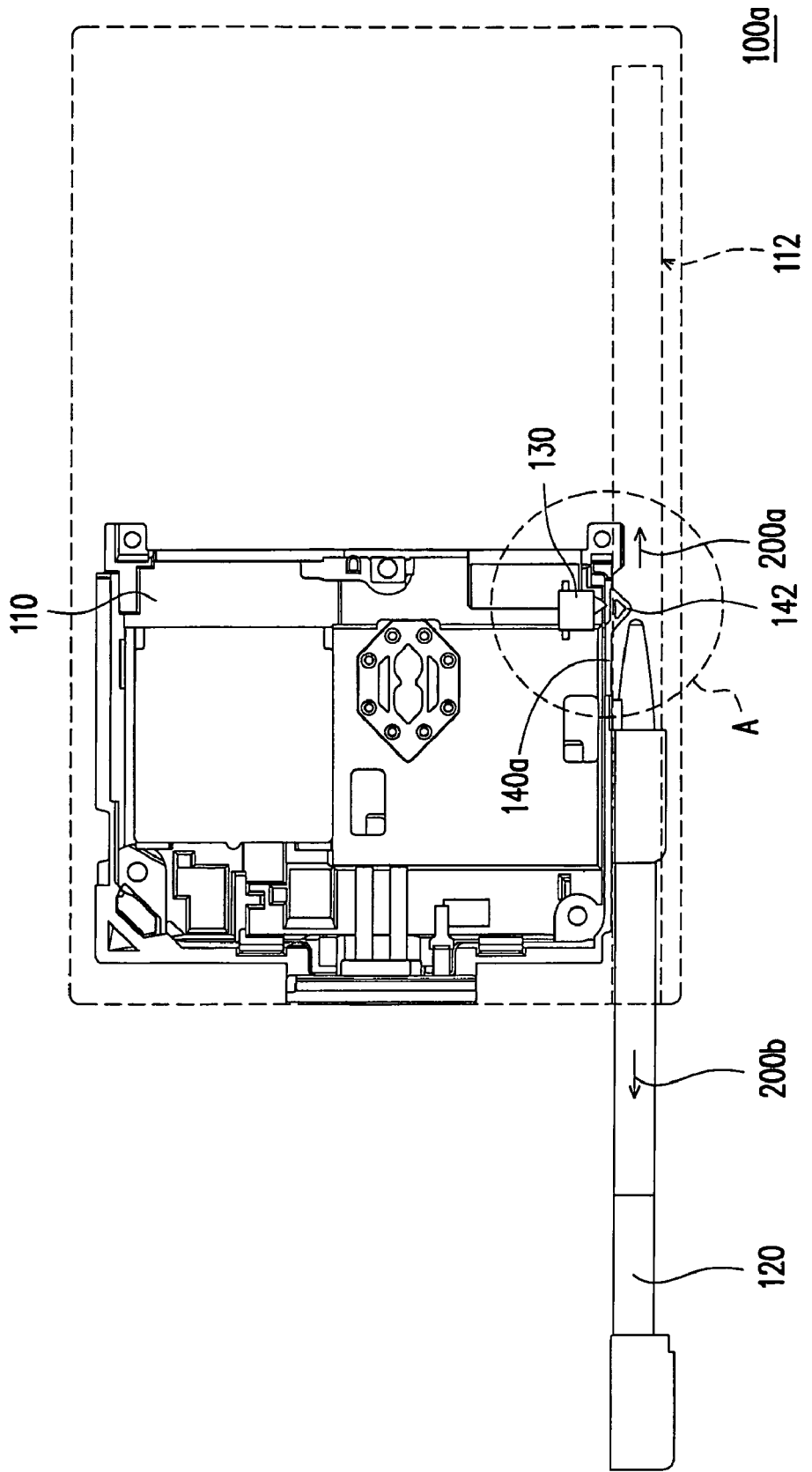
FIG. 1 is a structure diagram of a portable electronic device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
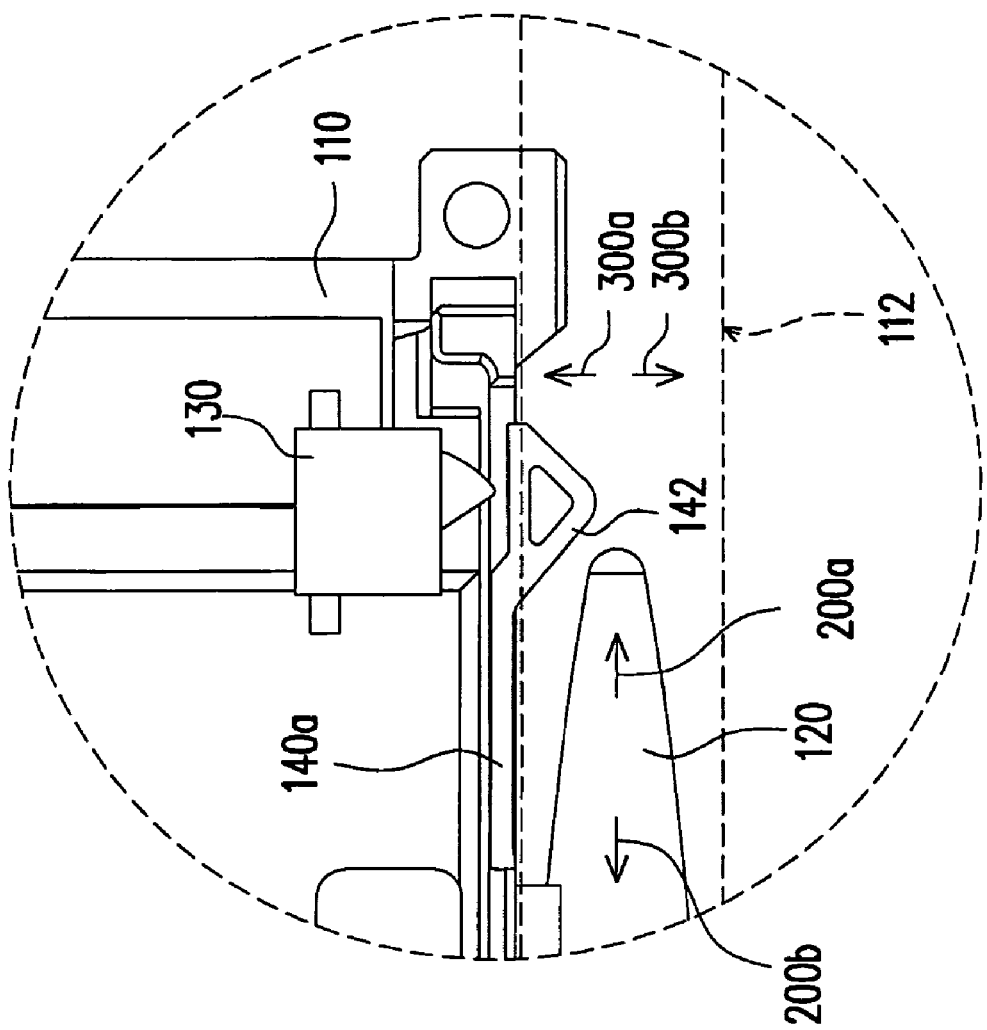
FIG. 2 is an enlargement diagram at location A as shown in FIG. 1.

FIG. 1 is a structure diagram of a portable electronic device according to an embodiment of the present invention and FIG. 2 is an enlargement diagram at location A as shown in FIG. 1. In the following embodiments, a portable electronic device can be, for example, a mobile phone, a smart phone or a personal digital assistant (PDA). And, in the figures listed below, the casing of the portable electronic device is omitted so as to more clearly illustrate the relationship between the stylus and the switch, and the actions thereof.

However, in other embodiments not described herein, the portable electronic device can also be, for example, an ultra mobile personal computer (UMPC), a tablet PC, a pocket PC, or other portable electronic devices with a stylus.

Referring to FIGS. 1 and 2, a portable electronic device 100a includes a main body 110, a stylus 120, a switch 130 and a swinging member 140a. The main body 110 has a containing slot 112 and the stylus 120 is suitable for being inserted into the containing slot 112. The switch 130 is disposed at a side of the containing slot 112 and electrically connected to the main body 110, wherein the switch 130 is disposed, for example, near to the middle portion of the containing slot 112, so that an operation stability of the switch 130 is better. The swinging member 140a is disposed between the containing slot 112 and the switch 130, and the swinging member 140a has a protrusion portion 142. In addition, an end of the swinging member 140a is fixed at the main body 110 and an extension direction of the swinging member 140a is parallel to an extension direction of the containing slot 112. The protrusion portion 142 protrudes into the containing slot 112, and a portion of the protrusion portion 142 is disposed on a moving path of the stylus 120 in the containing slot 112. Note that the containing slot 112, the switch 130 and the swinging member 140a are designed and fabricated with dimension margins to allow a reasonable assembly tolerance.

When the stylus 120 is inserted into the containing slot 112 along a first direction 200a, the stylus 120 pushes the protrusion portion 142 of the swinging member 140a to swing so that the protrusion portion 142 is deformed elastically along a third direction 300a (shown in FIG. 2) to press the switch 130 to enable the main body 110 to execute a presetting function. In the embodiment, the above-mentioned presetting function is, for example, to switch off a display unit (not shown) of the main body 110.

When the stylus 120 is taken out from the containing slot 112 along a second direction 200b, the stylus 120 releases the swinging member 140a so that the swinging member 140a returns to an initial position along a fourth direction 300b (shown in FIG. 2) and release the switch 130 to enable the main body 110 to execute another presetting function. In the embodiment, the above-mentioned another presetting function is, for example, to switch on the display unit of the main body 110.

In other embodiments not described herein, the portable electronic device 100 without the swinging member 140a can be accomplished. For example, the switch 130 directly protrudes into the containing slot 112 and a portion of the switch 130 is disposed on the moving path of the stylus 120. In this case, when the stylus 120 is inserted into the containing slot 112 along the first direction 200a, the stylus 120 directly presses the switch 130 to enable the above-mentioned presetting function (for example, to switch off the display unit of the main body 110).

Note that the presetting functions executed by the main body 110 when the switch 130 is pressed or released are not limited to the above-mentioned switching on or off the display unit; in fact, the presetting functions can be quitting or executing an application program. For example, when a user completes a message and inserts the stylus 120 into the containing slot 112, the main body 110 may switch off a hand writing board or a screen keyboard; if the main body 110 is running a presetting gaming program, the user may switch off the gaming program by inserting the stylus 120 into the containing slot 112. In addition, the above-mentioned presetting function can be an alert sound provided by the main body 110. Moreover, the display unit of the main body 110 is locked, and the stylus 120 is inserted into the containing slot 112. The presetting function can be unlocked the display unit when the stylus 120 is taken out from the containing slot 112.

Yet another note that in the embodiments described hereinbefore, when the stylus 120 is inserted into or taken out from the containing slot 112, the main body 110 executes different presetting function; however, in other embodiments not described herein, when the stylus 120 is inserted into the containing slot 112, the main body 110 may not execute any presetting function. Alternatively, when the stylus 120 is taken out from the containing slot 112, the main body 110 may not execute any presetting function.

Figure 4:
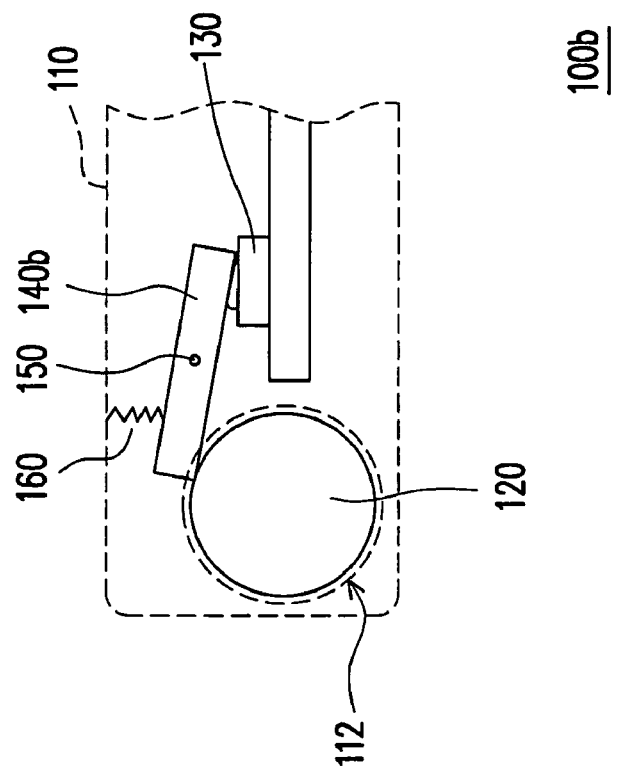
FIG. 4 is a structure diagram showing a stylus being inserted into the containing slot of the portable electronic device as shown in FIG. 3.
Figure 3:
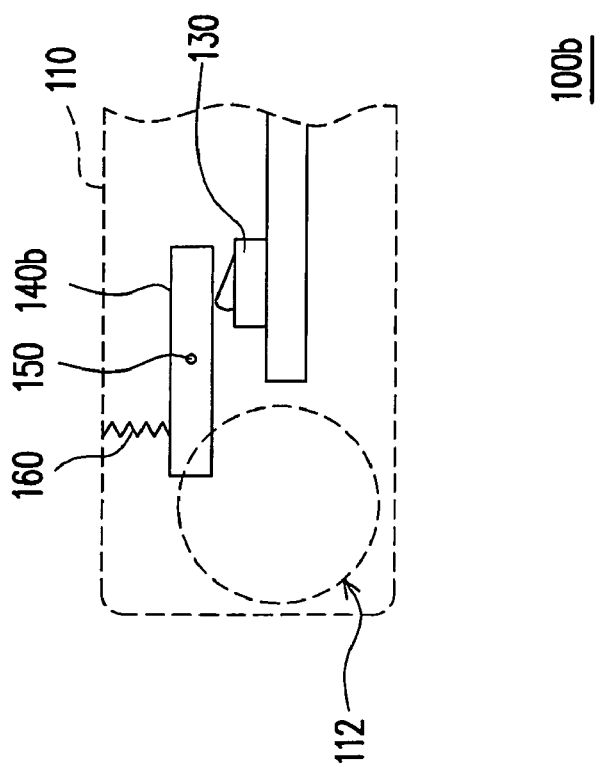
FIG. 3 is a structure diagram of a portable electronic device according to another embodiment of the present invention.

FIG. 3 is a structure diagram of a portable electronic device according to another embodiment of the present invention and FIG. 4 is a structure diagram showing a stylus being inserted into the containing slot of the portable electronic device as shown in FIG. 3. Referring to FIGS. 3 and 4, in the embodiment, a structure of a portable electronic device 100b is similar to that of the portable electronic device 100a in the previous embodiment except that the structure and action manner of the swinging member 140b in the embodiment is different from the swinging member 140a of the previous embodiment.

In the embodiment, the swinging member 140b is disposed between the containing slot 112 and the switch 130, and the swinging member 140b is pivoted on the main body 110 around a rotating axis 150, wherein the rotating axis 150 is parallel to the extension direction of the containing slot 112. Besides, the portable electronic device 100b further includes an elastic element 160 disposed between the main body 110 and the swinging member 140b, wherein the elastic element 160 can be a spring. An end of the swinging member 140b protrudes into the containing slot 112, the elastic element 160 and the containing slot 112 are located at the same end of the swinging member 140b, and the switch 130 is disposed at another end of the swinging member 140b.

When the stylus 120 is inserted into the containing slot 112 as shown in FIG. 4, the stylus 120 pushes an end of the swinging member 140b to make the swinging member 140b swinging around the rotating axis 150 and pressing the elastic element 160 so as to make the elastic element 160 deformed elastically; meanwhile another end of the swinging member 140b presses the switch 130 to enable the main body 110 to execute a presetting function.

When the stylus 120 is taken out from the containing slot 112 as shown in FIG. 3, the elastic element 160 pushes an end of the swinging member 140b to make the swinging member 140b swinging around the rotating axis 150 and returning to the initial position; meanwhile another end of the swinging member 140a releases the switch 130 to enable the main body 110 to execute another presetting function.

In summary in the present invention, when the stylus is inserted into the containing slot, the switch is pressed to enable the main body to execute a presetting function. On the other hand, when the stylus is taken out from the containing slot, the switch is released to enable the main body to execute another presetting function. In this way, a user can execute a presetting function by taking out or placing back the stylus instead of an operation action, which enhances the operation convenience of the portable electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A portable electronic device, comprising:
a main body having a containing slot;
a stylus suitable for being inserted into the containing slot; and
a switch disposed at a side of the containing slot and electrically connected to the main body;
a swinging member disposed between the containing slot and the switch, wherein a center portion of the swinging member is pivoted on the main body, a first end of the swinging member is located in the containing slot, and the switch is disposed at a second end of the swinging member,
when the stylus is inserted into the containing slot, the stylus pushes the first end of the swinging member to swing, and the second end of the swinging member presses the switch; and when the stylus is taken out from the containing slot, the swinging member returns to an initial position to release the switch so as to enable the main body to execute a presetting function.

2. The portable electronic device according to claim 1, wherein the main body further has a display unit and the presetting function comprises controlling the display unit to be switched on or off.

3. The portable electronic device according to claim 1, wherein the swinging member is pivoted on the main body around a rotating axis and the rotating axis is parallel to the extension direction of the containing slot.

4. The portable electronic device according to claim 3, further comprising an elastic element disposed between the main body and the swinging member, wherein when the stylus is inserted into the containing slot, the stylus pushes the swinging member to swing to press the switch and the elastic element is deformed elastically; when the stylus is taken out from the containing slot, the elastic element pushes the swinging member to return to the initial position and the switch is released.

5. The portable electronic device according to claim 4, wherein the elastic element and the containing slot are located at the same end of the swinging member.

6. A method for operating the portable electronic device of claim 1, wherein the stylus is inserted into the containing slot, comprising:
- taking the stylus out from the containing slot, wherein the switch is released until the head of the stylus gets past the switch, and then the main body executes the presetting function.

7. The method according to claim 6, wherein the presetting function comprises controlling the display unit to be switched on or off.

8. The method according to claim 6, wherein the presetting function comprises quitting or executing an application program.

9. The method according to claim 6, wherein the presetting function comprises generating an alert sound.

10. The method according to claim 6, wherein the presetting function comprises unlocking the display unit of the main body.

* * * * *